INVENTORS
LEONARD O. CARLSEN
HERMAN A. MALE
BY
*Richard W. Treverton*
ATTORNEY

Aug. 11, 1959  L. O. CARLSEN ET AL  2,898,813
CHAMFERING MACHINE
Original Filed Oct. 18, 1954  2 Sheets-Sheet 2
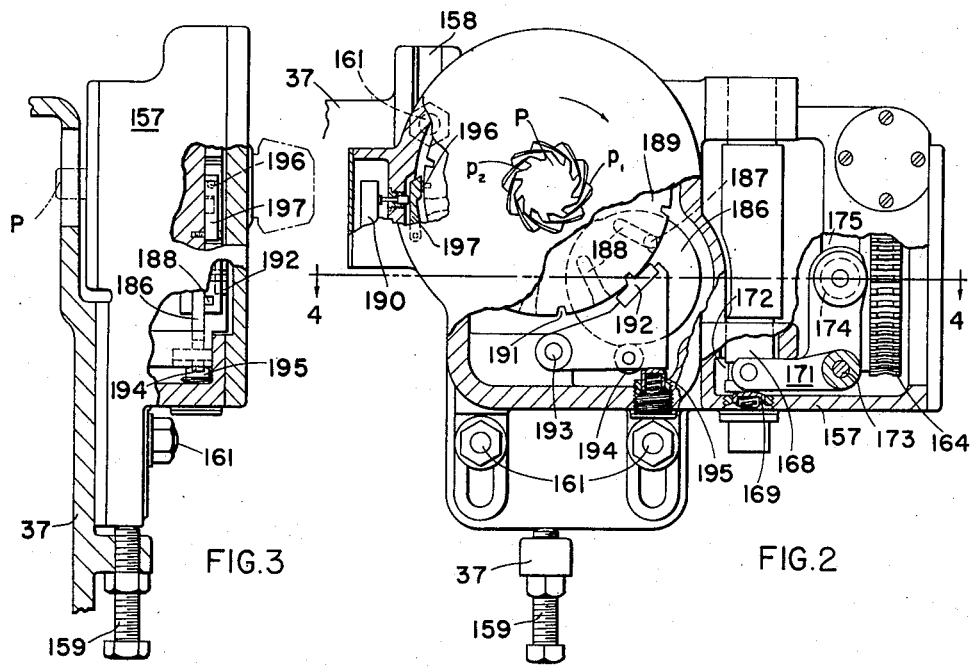
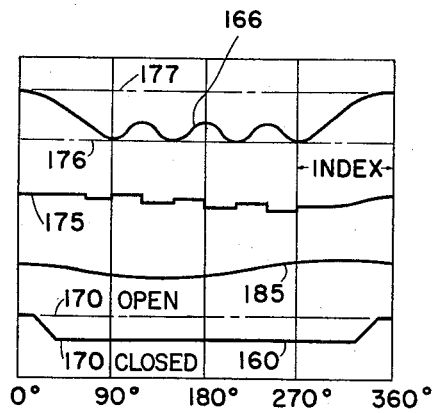
FIG.5
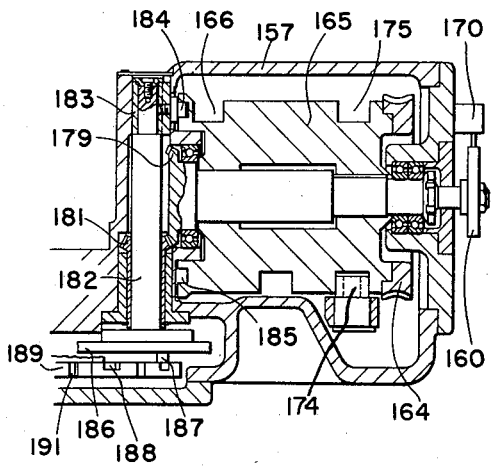
FIG.4
INVENTORS
LEONARD O. CARLSEN
HERMAN A. MALE
BY
*Richard W. Treverton*
ATTORNEY United States Patent Office 2,898,813
Patented Aug. 11, 1959

2,898,813

CHAMFERING MACHINE

Leonard O. Carlsen, Rochester, and Herman A. Male, Brighton, N.Y., assignors to The Gleason Works, Rochester, N.Y., a corporation of New York Original application October 18, 1954, Serial No. 462,660, now Patent No. 2,782,689, dated February 26, 1957. Divided and this application July 11, 1955, Serial No. 521,260

7 Claims. (Cl. 90—1.4)

The present invention relates to a machine for chamfering gears and similar toothed parts, especially but not exclusively spiral bevel and hypoid pinions, after the teeth thereof have been cut. In its preferred form the machine is adapted for use in connection with, or as a part of, a gear cutting machine having an automatic loading mechanism, as disclosed in our patent application Serial No. 462,660, filed October 18, 1954, Patent No. 2,782,689, February 26, 1957, of which the present invention is a division.

According to the present invention the chamfering machine comprises a housing, a spindle journaled in said housing and adapted to support a toothed workpiece, an arm carrying a tool, said arm being mounted on the housing for angular oscillation and also for translation about the axis of oscillation, and a power driven mechanism for oscillating the arm and also for feeding the arm along said axis in predetermined relation to such oscillation to thereby cause the tool to take successive cuts of predetermined thickness on the workpiece.

The foregoing and other aspects of the invention, and the advantages thereof, will appear further from the following description made with reference to the drawings, wherein:

Fig. 2 is a view partly in elevation and partly in vertical section in plane 2—2 of Fig. 1 and in planes parallel thereto;

Fig. 3 is a view in vertical planes perpendicular to Fig. 2;

Fig. 4 is a horizontal sectional view taken in plane 4—4 of Fig. 2;

Fig. 5 is a diagram illustrating the operating cycle of the machine; and,

Figure 1:
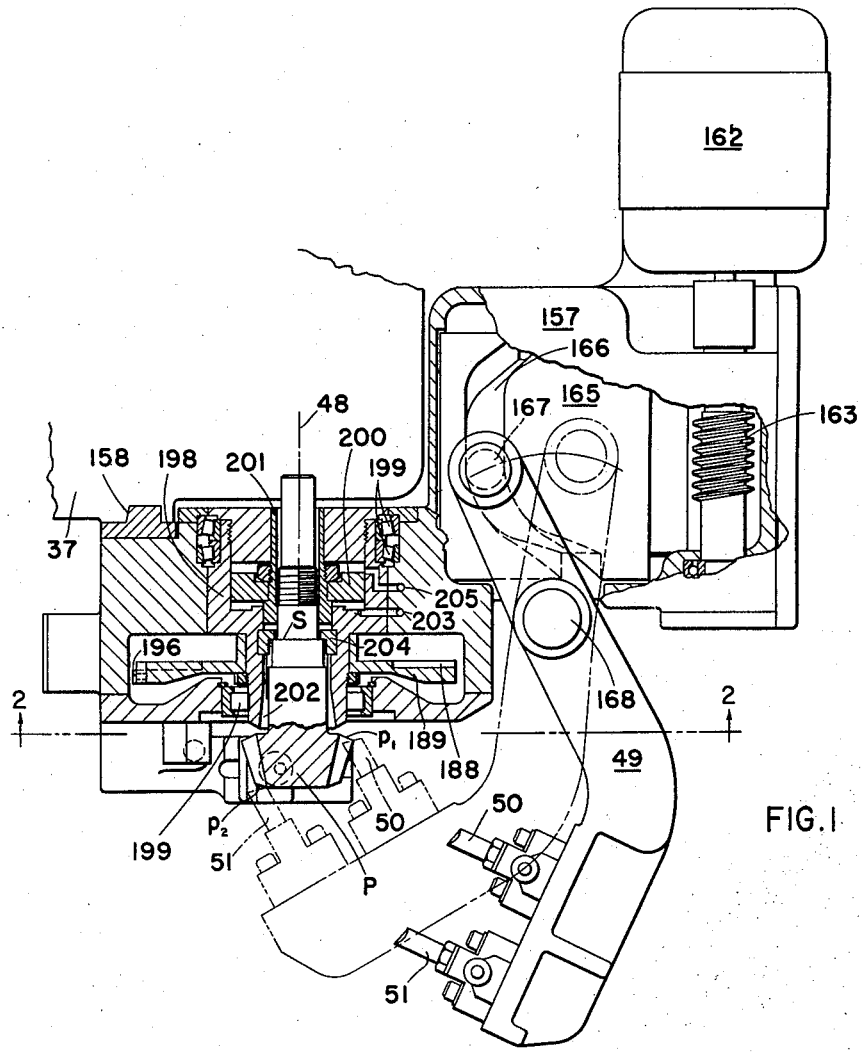
Fig. 1 is a plan view of the machine partly in horizontal section.

The particular machine that is illustrated comprises a housing 157 which is adjustable along a vertical way 158 on the work head column 37 of a spiral bevel and hypoid pinion generating machine. This adjustment is effected by means of an adjusting screw 159, for the purpose of aligning the chamfering mechanism with a loading attachment on the generating machine. After such adjustment is made the housing 157 is firmly clamped to the column 37 by tightening clamp bolts 161. Mounted on the housing is a drive motor 162 which through a gear reduction comprising a worm 163 and a wormwheel 164 rotates a cam 165. This cam is mounted in the housing on anti-friction bearings and has a peripheral cam track 166 for a roller 167, the latter being mounted on the inner end of chamfering arm 49. Two chamfering tools 50 and 51 are adjustable on the arm so that they may be positioned to simultaneously chamfer the sharp edges at both the large and small ends of the teeth of the workpiece, hypoid pinion P. Thus tool 50 in its broken line position in Fig. 1 chamfers edge $p_1$ at the large end of one tooth while tool 51 chamfers edge $p_2$ at the small end of an approximately diametrically opposite tooth. See also Fig. 2. The arm is mounted on a shaft 168 which is journaled in the housing for both angular and axial motions, and is partially supported by a spring-backed axial thrust bearing 169. Axial (vertical) motion of the shaft 168 is controlled by a lever 171 which has a forked end carrying rollers that engage in an annular groove 172 in the shaft. The lever, which is fulcrumed on the housing by pin 173, also carries a roller 174 engaged in a peripheral track 175 of cam 165. The shape of tracks 166 and 175 of cam 165, and their effective phase relationship, is indicated in the diagram, Fig. 5. The cam makes one turn to completely chamfer the ends of each tooth. During this turn the track 166 effects four cutting strokes and four return strokes of the arm 49, the latter being in its forward position shown in broken lines in Fig. 1 at the points where track 166 touches line 176 in Fig. 5, and being fully retracted to its full line position in Fig. 1 where the track touches line 177 in Fig. 5. Preceding each cutting stroke the arm is fed axially by cam track 175, lowered in this case, so that the tools 50, 51 will remove stock from the work. Preceding each return stroke of the arm the track 175 effects an axial return feed so that the tools will clear the cut surfaces as they return. After the fourth cutting stroke track 166 swings the arm to its fully retracted position wherein it dwells while the work is indexed to bring successive teeth into position for chamfering; and the track 175 returns the arm axially to its initial raised position. As shown in Fig. 5 the first cutting stroke and the last return stroke of arm 49 are relatively long, to meet the requirement that the tools retract to a position clear of the path of a transfer member, shown in aforementioned application Serial No. 462,660, which carries the workpiece P to and from the chamfering machine.

Rotating with cam 165, Fig. 4, is a cam 160 for operating a switch 170 for controlling the motor 162, and also a bevel gear 179 which drives a tubular pinion 181. This pinion is journaled for rotation in housing 157 and is splined to a shaft 182 which is both rotatable and axially movable. The shaft is journaled in a sliding block 183 which has a cam follower roller 184 in a continuous cam track 185 formed in the end face of cam 165. Affixed to the lower end of the shaft is a disc cam 186 carrying a Geneva index drive pin 187 which is periodically engageable in radial slots 188 of a Geneva index plate 189 which rotates as a unit with the workpiece P. The number of slots 188 corresponds to the number of teeth on the workpiece, and the plate also has a like number of notches 191 for receiving a lock dog 192 which is pivoted at 193 to the housing. The dog carries a roller 194 and is urged toward the index plate by a spring-backed plunger 195.

As shown in Fig. 5, while the chamfering arm 49 is being oscillated the roller 184 is in a dwell of cam track 185 which holds the shaft 182 in the position shown in Fig. 4 in which the cam disc 186 is offset from the plane of the dog-carried roller 194 and pin 187 is offset from the plane of index plate 189. Accordingly the parts 186, 187 rotate idly and spring means 195 holds dog 192 engaged in one of the index plate notches 191.

When the swinging motion of the arm is completed, i.e. during the portion of the cycle designated "Index" in Fig. 5, cam track 185 moves the shaft 182 axially, so that disc 186 and pin 187 are brought into the respective planes of roller 194 and plate 189. Accordingly during the next revolution of shaft 182 the pin enters a slot 188 and advances the plate and the workpiece by one circular pitch. Just before the pin commences to drive the index plate the cam 186 acts through roller 194 to lift the dog from recess 191, and just before the pin leaves the slot 188 the cam allows the dog to drop into the next notch.

Each such indexing operation is succeeded by chamfering strokes of tools 50, 51, the motor 162 rotating the drive cam 165 continuously until all the teeth of the workpiece have been chamfered. At this time the main cam 165 has made as many revolutions as there are teeth on the workpiece, and a button 196, Figs. 2 and 3, on the index plate now acts through a pivoted arm 197 to open a switch 190 for stopping the motor.

As shown in Fig. 1, the index plate is secured to the chamfering device work spindle 198 which is rotatable in the housing 157 on anti-friction bearings 199. Slidable in a cylinder in the spindle is a piston 200 secured to a collet 201 which has a split outer end 202 having a conical outer surface and a cylindrical inner surface. This inner surface is adapted to receive the shank of the work pinion P while the conical outer surface is received in a tapered bore of the spindle so that upon inward movement of the piston, effected by hydraulic pressure applied through passage 203, the split end of the collet is contracted to tightly grip the workpiece and draw its shoulder S firmly against a seat 204 in the spindle. Upon reversal of the hydraulic pressure, i.e. by applying it through passage 205, the piston and the collet 201, 202 are moved forwardly to free the workpiece. A suitable system, not shown, comprising a source of fluid under pressure and a reversing valve, is concerned to the passages 203 and 205.

Figure 6:
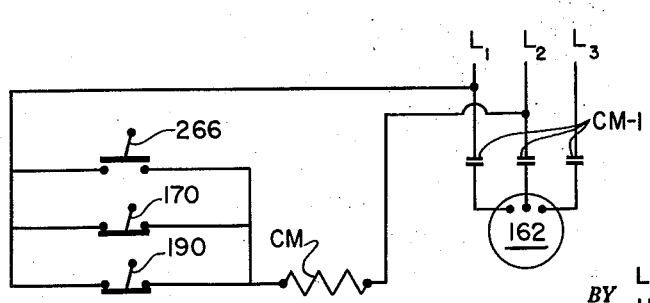
Fig. 6 is a simplified wiring diagram of the machine.

The simplified electrical system shown in Fig. 6 comprises, in addition to the machine operated switches 170 and 190 and the motor 162, a motor controller comprising winding CM and normally open contacts CM–1 which, when the winding CM is energized, close to connect the motor to leads $L_1$, $L_2$ and $L_3$ of a three-wire current supply system. There is also a control switch 266.

To operate the machine a workpiece P is inserted in the spindle 198, with its teeth properly aligned with the cutting tools 50, 51; and is chucked by application of hydraulic pressure through passage 203. Then the switch 266 is momentarily closed (switches 170 and 190 both being open at this time), establishing a circuit from $L_1$ to $L_2$ through controller winding CM. This causes contacts CM–1 to close and the motor 162 to operate. Almost immediately the switch 170 is closed by cam 160, so that the circuit through the controller winding CM is maintained despite subsequent opening of switch 266. The motor continues to operate, causing a chamfering operation succeeded by an indexing operation, as previously described. During the first indexing operation the button 196 is moved from beneath the arm 197, allowing switch 190 to close, shunting switch 170 so that when the latter opens at the end of the indexing operation the circuit through winding CM is still maintained and motor 162 continues to run. Indexing is followed by chamfering, and so on, until all of the teeth of the workpiece P have been chamfered, the switch 170 opening and closing without effect. Then, during the last indexing operation, the button 196 again passes beneath arm 197, opening switch 190, and at the conclusion of this index operation, when switch 170 is opened by cam 160, the circuit through controller CM is broken, stopping the motor. Pressure is now released from passage 203 and applied to passage 205, thereby causing dechucking of the workpiece which may then be removed from the work spindle.

Having now described the preferred embodiment of our machine, and its mode of operation, what we claim as our invention is:

1. A chamfering machine or the like comprising a housing, a spindle journaled in said housing and adapted to support a toothed workpiece, an arm carrying a tool, said arm being mounted on the housing for angular oscillation and also for translation along the axis of oscillation, and a power driven mechanism for oscillating the arm and also for feeding the arm along said axis in predetermined relation to such oscillation to thereby cause the tool to take successive cuts of predetermined thickness on the workpiece.

2. A machine according to claim 1 in which said power driven mechanism is arranged to effect a reverse feed motion of the arm preceding each non-cutting swing thereof to cause the tool to clear the work during such swing.

3. A machine according to claim 1 in which said mechanism for oscillating the arm comprises a cam having a continuous cam track thereon, said track being formed to provide a plurality of relatively short strokes of the arm for cutting and a relatively long stroke to swing the arm clear of the cutting zone after the last cutting stroke.

4. A machine according to claim 1 in which said power driven mechanism comprises a cam rotatable in the housing, said cam having one cam track for effecting a plurality of oscillations of the arm during each revolution, and said cam having a second cam track for effecting feed of the arm, so that on each cutting stroke of the arm additional stock is removed from the workpiece, and also for effecting return feed of the arm following the last cutting stroke.

5. A machine according to claim 4 in which the second cam track is arranged for effecting a reverse feed of the arm following each cutting stroke to cause the tool to clear the work during the succeeding return stroke.

6. A machine according to claim 1 in which there is a means, operating in time with said power driven mechanism and adapted to periodically index the spindle to bring successive teeth of a workpiece into cutting position.

7. A machine according to claim 6 in which the means for oscillating and feeding the arm comprises a cam rotatable in the housing, said cam having three continuous cam tracks of which one effects oscillation of the arm, the second a feed motion of the arm followed by a return motion to return the arm to its initial axial position, and the third the operation of said index means.

References Cited in the file of this patent

UNITED STATES PATENTS

| | | |
|---|---|---|
| 1,410,657 | Colliau | Mar. 28, 1922 |
| 1,960,536 | Haas | May 29, 1934 |